United States Patent
Ching Hwei

[11] Patent Number: 5,177,889
[45] Date of Patent: Jan. 12, 1993

[54] AUTO LICENSE PLATE'S ILLUMINATION STRUCTURE

[76] Inventor: Lan Ching Hwei, No. 9, Alley 1, Lane 458, Yuang Ho Rd., Chung Ho City, Taiwan

[21] Appl. No.: 616,282

[22] Filed: Nov. 20, 1990

[51] Int. Cl.⁵ ............................................. G09F 13/00
[52] U.S. Cl. ............................................. 40/204
[58] Field of Search ................. 40/546, 545, 543, 542, 40/541, 152.1, 204, 205, 206, 200

[56] References Cited

U.S. PATENT DOCUMENTS

| | | | |
|---|---|---|---|
| 1,664,302 | 3/1928 | Leopold et al. | 40/546 X |
| 1,787,545 | 1/1931 | Orester et al. | 40/204 |
| 1,787,595 | 1/1931 | Rava | 40/546 |
| 2,247,969 | 7/1941 | Stewart | 40/546 X |
| 2,494,179 | 1/1950 | King | 40/152.2 X |
| 2,523,290 | 9/1950 | Gardner | 40/152.2 |
| 2,548,126 | 4/1951 | Sholkin | 40/546 |
| 2,634,530 | 4/1953 | Herschede et al. | 40/546 |
| 4,475,298 | 10/1984 | Muñoz | 40/546 |

FOREIGN PATENT DOCUMENTS 523706  7/1940  United Kingdom .................. 40/546

*Primary Examiner*—Kenneth J. Dorner
*Assistant Examiner*—J. Bonifanti
*Attorney, Agent, or Firm*—Browdy and Neimark

[57] ABSTRACT

An auto license plate's illumination structure comprising a main cover transparent and engaged to license plate, a light source cover opaque and engaged to main cover's upper part and a few lighting installations to be hidden inside the light source cover. The main cover's inner wall is provided with a pattern of some decorative figures formed by many recessions in cross direction and parallelism. Of recession, the side wall which relatively close to light source is angled 45 degrees, and its remaining one at 90 or any other appropriate degrees. As passing main cover's inner wall, the lights of transmission from hidden light sources on one side will thus make an internal total reflection and shoot out from its outer wall, thereby illuminating license plate and, in particular, its decorative figures with the most brightness.

1 Claim, 2 Drawing Sheets

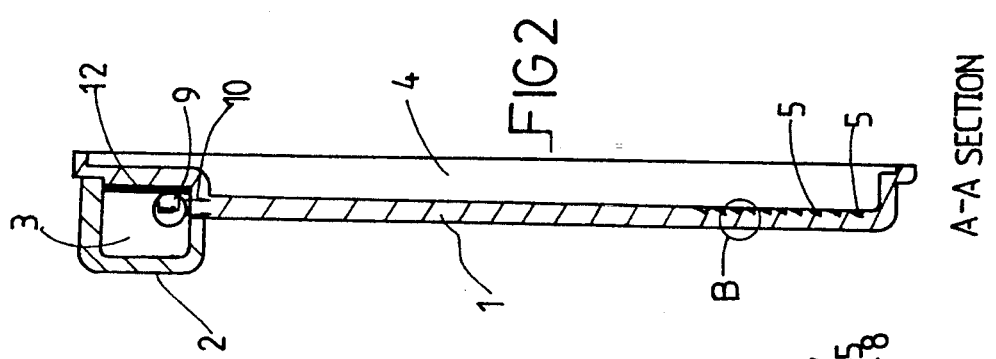
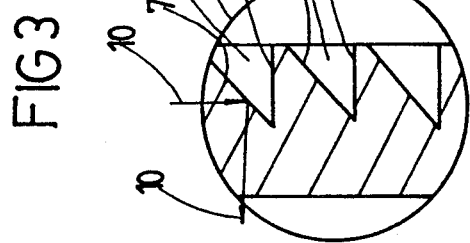
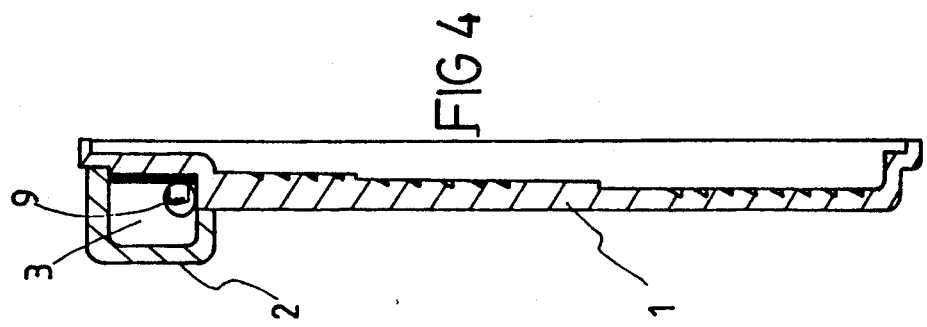

AUTO LICENSE PLATE'S ILLUMINATION STRUCTURE

FIELD OF THE INVENTION

The present invention relates to an auto license plate's illumination structure, and particularly to a transparent main cover whose inner wall is provided with a pattern of some decorative figures formed by many recessions in cross direction and parallel to one another which, as the lights of a transmission of hidden light sources on one side traveling therepast make an internal total reflection and shoot out from its outer wall, will be illuminated considerably.

BACKGROUND OF THE INVENTION

License plate seems simply used to meet requirement of traffic administration with any other particular purpose. But its presence to some degree disrupts a car's whole looking beauty. And the two illuminating lamps mounted beside license plate are looked too unproper. Therefore some improvement to make is needed.

OBJECTIVE OF THE INVENTION

The present invention aims to provide a new license plate which could give illumination as well as decoration effects meantime.

SUMMARY OF THE INVENTION

A license plate's illumination structure comprises a main cover which is transparent and has quite a large concave area inside to contain license plate, a light source cover opaque and engaged to main cover's upper part and a few lighting installations hidden inside the light source cover. The main cover's inner wall is provided with a pattern of some decorative figures formed by many recessions in cross direction and parallel to one another. Each recession has the two side walls; the one relatively close to light source is angled at 45 degrees and the remaining one at 90 or any other appropriate degrees. It is therefore expected, as the lights of transmission from its upperside passing therepast make an internal total reflection and shoot out from main cover's outer wall, license plate will be much illuminated and particularly its decorative figures with the most brightness.

BRIEF DESCRIPTION OF THE INVENTION

FIG. 2 is a sectional view taken along A—A line in FIG. 1;

FIG. 3 is an enlarged view of the B part in FIG. 2; and

FIG. 4 is a side view of this invention.

SPECIFIC DESCRIPTION

Figure 1:
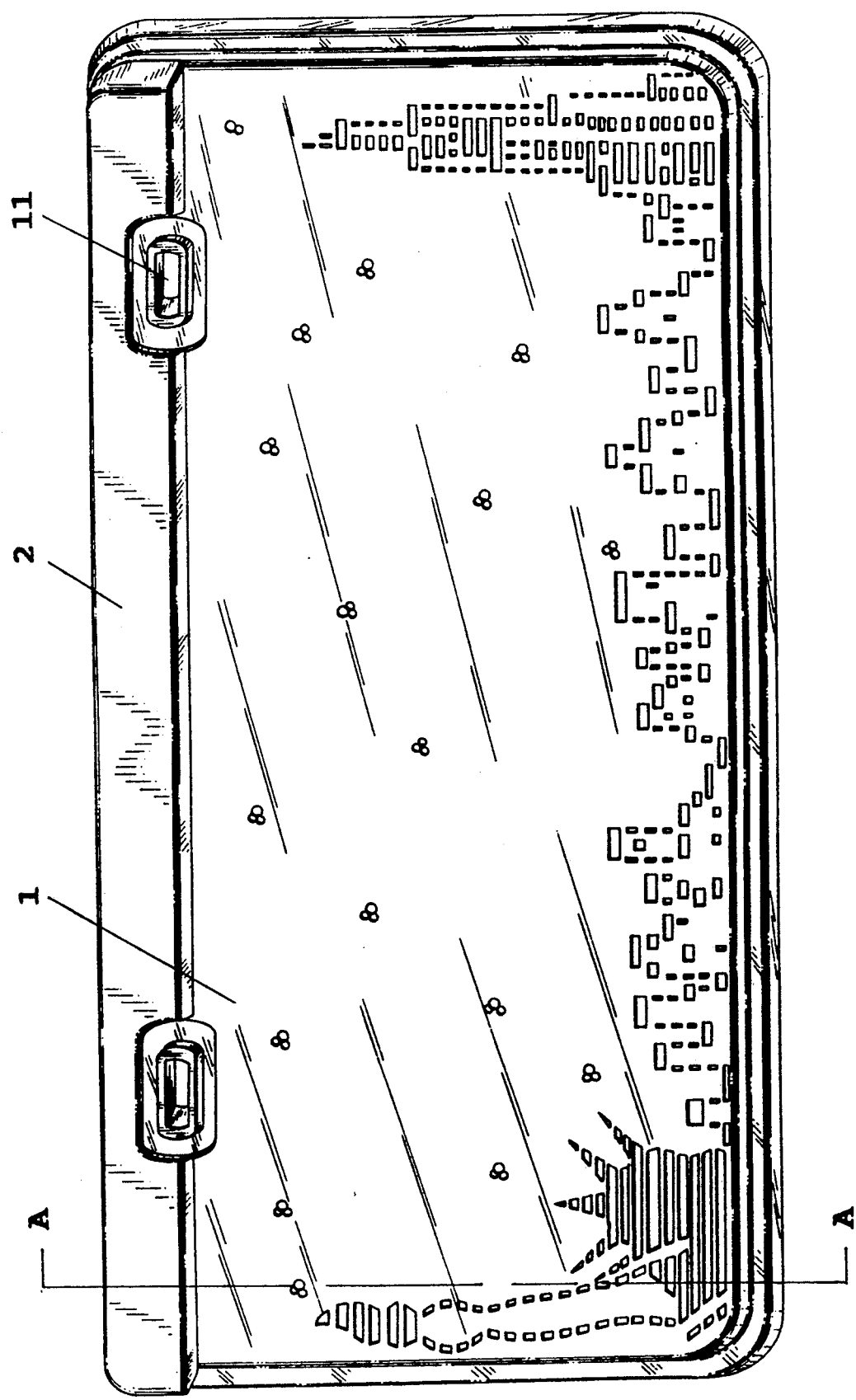
FIG. 1 is a perspective view of a preferred embodiment of this invention.

As FIGS. 1, 2 show, this invention comprises a main cover 1, a light source cover 2 and a few lighting installations 3. Main cover 1 is transparent and provided with quite a large concave area 4 inside to contain license plate (not shown). Against concave area 4, the main cover 1 is provided with an inner wall where a pattern of some decorative figures is shaped out by a number of recessions in cross direction and parallel to one another. Each recession 5 has two side walls 7, 8; the side wall 7 which relatively nears light source is angled with 45 degrees, and the remaining side wall 8 at an angle of 90 or any other appropriate degrees. Passing main cover's inner wall, therefore, the lights 10 transmitted from light bulbs 9 of lighting installations 3 hidden inside light source cover 2 will make an internal total reflection at barrier of the 45-degree interface and ultimately shoot out from its outer wall, thus strongly brightening decorative figures especially. For assembly concern, main cover 1 is provided with two mount holes 11 in its upper part where to correspond to the ones of license plate (as FIG. 1 shows). So, assembly may be easily completed by applying fixing screws through mount holes 11 to secure both the license plate and main cover 1 it is overlapped with to a vehicle body.

As FIGS. 1, 2 show, light source cover 2 is opaque and in a long U shape with closed end wall at both its ends. Once engaged to main cover's upper part outside lighting installations 3, light source cover 2 will thereby limit the transmission of lights 10 to enter main cover 1 only through its upperside thereof. A plurality of lighting installations 3 are provided and based on a long PC board 12 with small light bulbs 9 positioned thereon which right oppose the upperside edge of main cover 1, and a power lead connected to the vehicle's circuit (not shown).

To begin assembly, the screws of license plate which secure it on a vehicle body must be removed in the first place. Then it is required to engage this invention with license plate by making overlapping of them and apply the original fixing screws to have both secured back to the vehicle through mount holes 11. Then take this invention's power lead to connect with the vehicle's illumination circuit to finish assembly. Only if the illumination circuit is turned on, this invention will act, illuminating the license plate and particularly its decorative figures with a high degree of brightness.

As FIG. 4 shows, main cover's inner wall could in alternative be shaped to be staircase-like. Recessions 5 which distanced differently from light source then will enjoy a same degree of brightness in this fashion.

It has to be argued that recessions 5 of this invention forming a pattern of decorative figures are not limited only to this invention. They may be more widely applied to such articles as the nighttime lamp and wall-decorating lamp.

I claim:

1. An automobile accessory simultaneously illuminating a license plate having an identification number and a decorative pattern, said accessory comprising:

a substantially rectangular transparent main cover having a front face and back face, said back face having a decorative pattern formed by a plurality of recesses in a surface of said back face, said decorative pattern substantially located at sides and along a lower edge of said main cover to unobstructively reveal said identification number of said license plate, said transparent main cover having a concave area including said back face for housing said license plate on an automobile, said back face with said decorative pattern being directly over a license plate housed in said concave area, elongated opaque cover means mounted to an upper edge of said transparent main cover for directing light through said upper edge into said main cover, illumination means mounted within an interior of said opaque cover means for producing the light directed by said opaque cover means, each of said plurality of recesses having a first side wall and a second side wall, said first side all being closer to said light than said second side wall, said first side wall at a 45° angle to said back face of said main cover;

wherein the light produced by said illumination means is dispersed to simultaneously illuminate both said license plate, including an identification number housed in said concave area and the decorative pattern formed on said back face of said main cover over said license plate.

* * * * *